(12) United States Patent
Chang

(10) Patent No.: US 8,952,669 B2
(45) Date of Patent: Feb. 10, 2015

(54) AVERAGE INDUCTOR CURRENT MODE VOLTAGE CONTROL DEVICE AND METHOD

(71) Applicant: Yung-I Chang, Taipei (TW)

(72) Inventor: Yung-I Chang, Taipei (TW)

(73) Assignee: Alpha & Omega Semiconductor, Inc., Sunnyvale, CA (US)

( * ) Notice: Subject to any disclaimer, the term of this patent is extended or adjusted under 35 U.S.C. 154(b) by 299 days.

(21) Appl. No.: 13/690,155

(22) Filed: Nov. 30, 2012

(65) Prior Publication Data
US 2014/0152281 A1 Jun. 5, 2014

(51) Int. Cl.
*H02M 3/156* (2006.01)
*G05F 1/46* (2006.01)

(52) U.S. Cl.
CPC ........................................ *G05F 1/468* (2013.01)
USPC ............................................................ 323/282

(58) Field of Classification Search
USPC ......... 323/222, 223, 282, 284, 285, 311, 312, 323/313, 315, 317
See application file for complete search history.

(56) References Cited

U.S. PATENT DOCUMENTS

| 5,734,259 | A | * | 3/1998 | Sisson et al. | 323/282 |
| 7,710,084 | B1 | * | 5/2010 | Guo | 323/224 |
| 7,737,668 | B2 | * | 6/2010 | Oswald et al. | 323/259 |
| 7,795,846 | B2 | * | 9/2010 | Martin | 323/222 |
| 7,855,539 | B1 | * | 12/2010 | Wong et al. | 323/283 |
| 8,723,494 | B2 | * | 5/2014 | Galloway et al. | 323/282 |
| 8,766,617 | B2 | * | 7/2014 | Wan et al. | 323/285 |

* cited by examiner

*Primary Examiner* — Gary L Laxton
*Assistant Examiner* — Alex Torres-Rivera
(74) *Attorney, Agent, or Firm* — Chein-Hwa Tsao; CHEmily LLC (57) ABSTRACT

An average inductor valley current mode voltage control device for a DC/DC converter comprises a sample-hold inductor valley voltage unit receiving at least two inductor valley currents of at least two consecutive cycles produced by the inductor and then converting the at least two inductor valley currents into an average inductor valley voltage; and a reference voltage generation unit connected to the sample-hold inductor valley voltage unit and a transistor switch of the DC/DC converter and receiving a voltage two times of an external voltage corresponding to two times of an average inductor current produced by the inductor, wherein a reference voltage is generated by subtracting the average inductor valley voltage from the voltage two times of the external voltage for control of the switching of the transistor switch of the DC/DC converter while a peak inductor current is stabilized at a designated value.

16 Claims, 5 Drawing Sheets

AVERAGE INDUCTOR CURRENT MODE VOLTAGE CONTROL DEVICE AND METHOD

CROSS-REFERENCE TO RELATED APPLICATIONS

This application claims the priority benefit of Chinese patent application number 201210299698.2 filed Aug. 21, 2012 by a common inventor of this Application. The entire Disclosure made in the Chinese Patent Application 201210299698.2 is hereby incorporated by reference.

This Patent Application is a Continuation in Part (CIP) Application of a co-pending application Ser. 13/324,121 filed Dec. 13, 2011 by a common inventor of this Application. The Disclosure made in the patent application Ser. No. 13/324,121 is hereby incorporated by reference.

FIELD OF THE INVENTION

The invention relates to a control technology used in DC/DC converter, particularly relating to an average inductor current mode voltage control device and method.

DESCRIPTION OF THE RELATED ART

There are different kinds of voltage converter, for example an AC/AC converter, an AC/DC converter, a DC/DC converter and a DC/AC converter. For the DC/DC converter, in many electronic circuits, some electronic elements require two or more power supplies, for example liquid crystal display, voltage comparator, operational amplifier and the likes, or different operating voltages, thus the DC/DC converter is needed to obtain the desired voltage.

Figure 1:
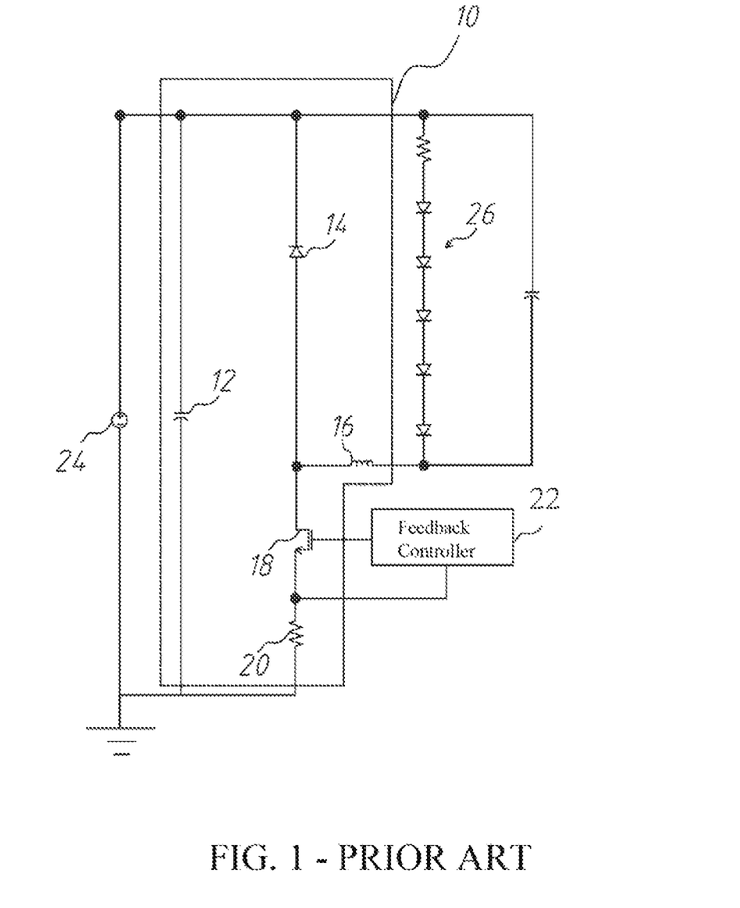
FIG. 1 is a circuit diagram of a DC/DC converter in prior art.
Figure 2:
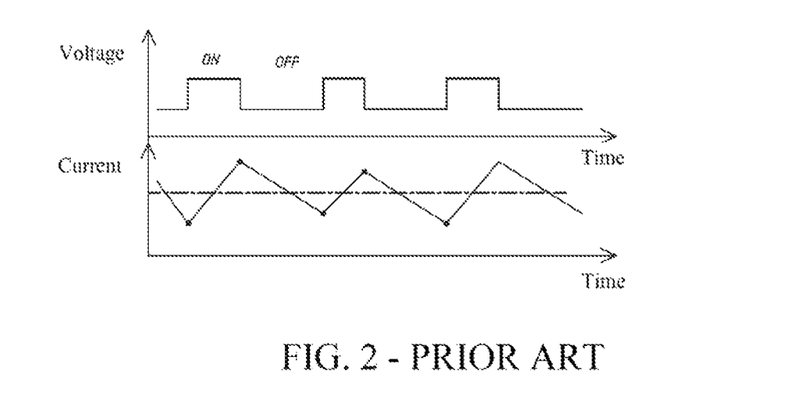
FIG. 2 shows waveform diagrams of the inductor current and inductor voltage of controlling the transistor switch in prior art.
Figure 3:
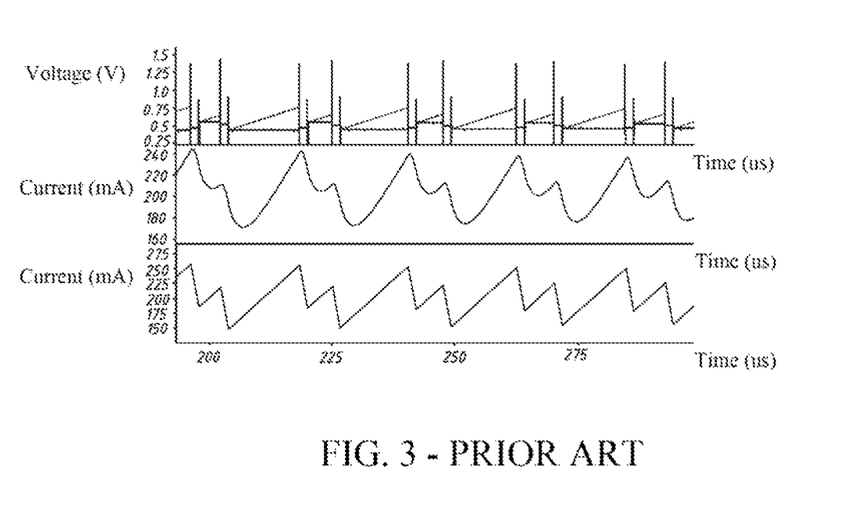
FIG. 3 shows waveform diagrams of source voltage of the transistor switch, current of diode string and inductor current in the prior art.

As shown in FIG. 1, a DC/DC converter 10 includes a capacitor 12, a diode 14, an inductor 16, a transistor switch 18 and a resistor 20. The switching state of the transistor switch 18 is controlled by a feedback controller 22. When the transistor switch 18 is ON, current from the input power 24 flows cross the inductor 16, and thus the energy is stored in the inductor 16. When the transistor switch 18 is OFF, the inductor current stored in the inductor 16 is released to the resistor 20 to maintain the output voltage. The current stored in the inductor 16 can be detected by the feedback controller 22, thus the feedback controller 22 produces a control signal for controlling the transistor switch 18. FIG. 2 shows the waveforms of the current and voltage in the inductor 16. In the current waveform, the peak current value is equal to two times of the average inductor current value subtracting the valley current value and the time interval of the voltage at low level is fixed. Through the negative feedback control mode, when the input power 24 is increased to hundreds of volts, the peak current value and the valley current value are not fixed, particularly, if the valley current value is lower, the peak current value is higher and vice versa. FIG. 3 shows the source voltage waveform (dotted line) of the transistor switch 18, the inductor current waveform and the waveform of the current flowing cross a diode string 26 in sequence. Thus it is clear that the peak and valley of the inductor current are continually changed.

For this reason, the invention proposes average inductor current mode voltage control device and method used in DC/DC converter.

SUMMARY THE INVENTION

The invention provides an average inductor current mode voltage control device and method using variable reference voltage system. A new reference voltage is generated by subtracting an average inductor valley voltage, which corresponds to an average of two inductor valley currents of two consecutive cycles, from two times of an external voltage provided as an designated voltage for the DC/DC converter operation, as such the peak inductor current is fixed, and as a result, the accuracy of voltage adjustment is improved and is independent on the inductance value in the DC/DC converter.

The invention provides an average inductor current mode voltage control device including a sample-hold inductor valley voltage unit that is connected to a constant off-time mode DC/DC converter, which receives at least two inductor valley currents of two consecutive cycles, and then the two inductor valley currents are converted into an average inductor valley voltage. A reference voltage generation unit, which is connected to a transistor switch of the DC/DC converter and the sample-hold inductor valley voltage unit, receives two times of an external voltage corresponding to two times average inductor current, which is then subtracted by the average inductor valley voltage thus generating a new reference voltage for controlling the switching of the transistor switch of the DC/DC converter, as such, the peak inductor current is stabilized at a designated value determinate by the external voltage.

The average inductor current mode voltage control device further includes a comparator connected to the sample-hold inductor valley voltage unit, the reference voltage generation unit, and the transistor switch of the DC/DC converter. The comparator receives the reference voltage and the inductor valley voltage and generates a compared result for controlling the switching of the transistor switch of the DC/DC converter. When the reference voltage and the inductor valley voltage are equal, it means that the compared result is a cut-off signal that turn off the transistor switch within the DC/DC converter (OFF). As a result, the peak inductor current can be stabilized at a designed value. Conversely, when the reference voltage and the inductor voltage are not equal, it means that the compared result is an ON-state signal that keeps the transistor switch on.

The two inductor valley currents of two consecutive cycles include a first inductor valley current of an immediately previous cycle and a second inductor valley current of the current cycle respectively. The average inductor valley voltage is the average of the first inductor valley voltage and the second inductor valley voltage corresponding to the first inductor valley current and the second inductor valley current respectively.

The sample-hold inductor valley voltage unit includes first and second sub-sample-hold inductor valley voltage units. The first sub-sample-hold inductor valley voltage unit includes a first sequence switch, a first hold inductor valley voltage unit, and the second sub-sample-hold inductor valley voltage unit includes a second sequence switch and a second hold inductor valley voltage unit. The first sequence switch is connected to the DC/DC converter for receiving the first inductor valley current and the second inductor valley current of two consecutive cycles. The first hold inductor valley voltage unit is connected to the first sequence switch to receive the first inductor valley current or the second inductor valley current and convert the first inductor valley current or the second inductor valley current into one half of the first valley voltage or one half of the second inductor valley voltage respectively. The second sequence switch is connected to the first hold inductor valley voltage unit as a transmitting path of the one half of the first inductor valley voltage when the inductor current is gradually decreased and the second hold inductor valley voltage unit is connected to the second sequence switch to receive the one half of the first inductor valley voltage.

The first hold inductor valley voltage unit includes a first amplifier, a first transistor switch, a first capacitor and a first resistor, where the first amplifier is connected to the first sequence switch to receive the first inductor valley current or the second inductor valley current and output the first conducting signal or the second conducting signal respectively. The first transistor switch is connected to the first amplifier and the reference voltage generation unit and receives the first conducting signal or the second conducting signal outputted from the first amplifier. One end of the first capacitor is grounded and the other end of the first capacitor is connected to the first sequence switch and the first amplifier, and one end of the first resistor is grounded and the other end of the first resistor is connected to the source of the first transistor switch and to the first amplifier. The first inductor valley current or the second inductor valley current is received by the first capacitor and the first resistor through the first sequence switch and then converted into one half of the first inductor valley voltage or one half of the second inductor valley voltage and are outputted through the first transistor switch.

The second hold inductor valley voltage unit includes a second amplifier, a second transistor switch, a second capacitor and a second resistor, where the second amplifier is connected to the second sequence switch to receive one half of the first inductor valley voltage thus outputs a third conducting signal. The second transistor switch is connected to the second amplifier and the reference voltage generation unit and receives the third conducting signal from the second amplifier. One end of the second capacitor is grounded and the other end of the second capacitor is connected to the second sequence switch and the second amplifier. One end of the second resistor is grounded and the other end of the second resistor is connected to the second transistor switch and the second amplifier with the resistance of the second resistor being the same as that of the first resistor. One half of the first inductor valley voltage is received by the second capacitor and the second resistor and is outputted through the second transistor switch.

The reference voltage generation unit includes a third amplifier, a third resistor, a third transistor switch, a current mirror and a fourth resistor. Two times of the external voltage is received by the third amplifier to produce a fourth conducting signal. The resistance of the third resistor is one half of that of the first resistor with one end of the third resistor grounded and the other end of the third resistor connected to the third amplifier. The third transistor switch is connected to the third amplifier and the third resistor to receive the fourth conducting signal from the third amplifier and two times of the average inductor current flowing cross the third transistor switch and the third resistor. The current mirror is connected to the third transistor switch. One end of the fourth resistor is grounded and the other end of the fourth resistor is connected to the current mirror with the resistance of the fourth resistor being the same as that of the third resistor. Two times of the average inductor current is copied by the current mirror to produce two times of the average inductor current flowing through the fourth resistor. Two times of the external voltage is subtracted by a sum of one half of the first inductor valley voltage and one half of the second inductor valley voltage thus generating the new reference voltage. A timing controller is connected to the DC/DC converter and to the first sequence switch and the second sequence switch to temporally turn on the first sequence switch at two consecutive cycles and to temporally turn on the second sequence switch between the two consecutive cycles when the inductor current gradually decreasing. Alternatively, the average inductor valley voltage also can be an average of a plurality of the inductor valley voltages each of which corresponds to an inductor valley current of the plurality of consecutive cycles.

The invention provides an average inductor current mode voltage control method for controlling a constant off-time DC/DC converter. The DC/DC converter includes a transistor switch and an inductor. At first, a voltage two times of the external voltage, corresponding to two times of the average inductor current, and two inductor valley currents of two consecutive cycles are received, and then the two inductor valley currents are converted into the average inductor valley voltage. Thus, two times of the external voltage is subtracted by the average inductor valley voltage to generate a new reference voltage that is the basis for controlling the switching of the transistor switch in the converter. The new reference voltage is compared to the inductor valley voltage produced by the inductor by a comparator producing a compared result for controlling the switching of the transistor switch of the DC/DC converter, as such the peak inductor current is fixed. For example, when the reference voltage is the same as the inductor voltage, the transistor switch is turned off, and when the reference voltage is different from the inductor voltage, the transistor switch remains on.

Specific embodiments will be described as follows with attached drawings for better understanding of the purpose, technical contents and characteristics as well as achieved effects of this invention.

DETAILED DESCRIPTION OF THE PREFERRED EMBODIMENTS

Since the inductor ripple current is half of the sum of the valley inductor current and the peak inductor current, the peak inductor current (Ipeak) equals to two times of the average inductor current (Iavg) subtracting the inductor valley current (Ivally), as shown in formula (1). In the present invention in order to fix the value of the peak inductor current (Ipeak), the inductor valley current (Ivally) can be defined as an average of two inductor valley currents (Iv1 and Iv2) of two consecutive cycles, as shown in formula (2). Based on the above principle, in the present invention, the inductor valley voltage can be defined as the average of the inductor valley voltage Vh1 and the inductor valley voltage Vh2 of two consecutive cycles, and thus the reference voltage Vref corresponding to the peak inductor current can be obtained by subtracting the average of the inductor valley voltage Vh1 and the inductor valley voltage Vh2 of two consecutive cycles from two times of the external inductor voltage Vext corresponding to two times of the average inductor current, as shown in formula (3). As a result, the peak inductor current Ipeak can be stabilized at a designated value.

$$I\text{peak}=2*I\text{avg}-I\text{vally} \quad (1)$$

$$I\text{peak}=2*I\text{avg}-(Iv1+Iv2)/2 \quad (2)$$

$$V\text{ref}=2*V\text{ext}-(Vh1+Vh2)/2 \quad (3)$$

Figure 4:
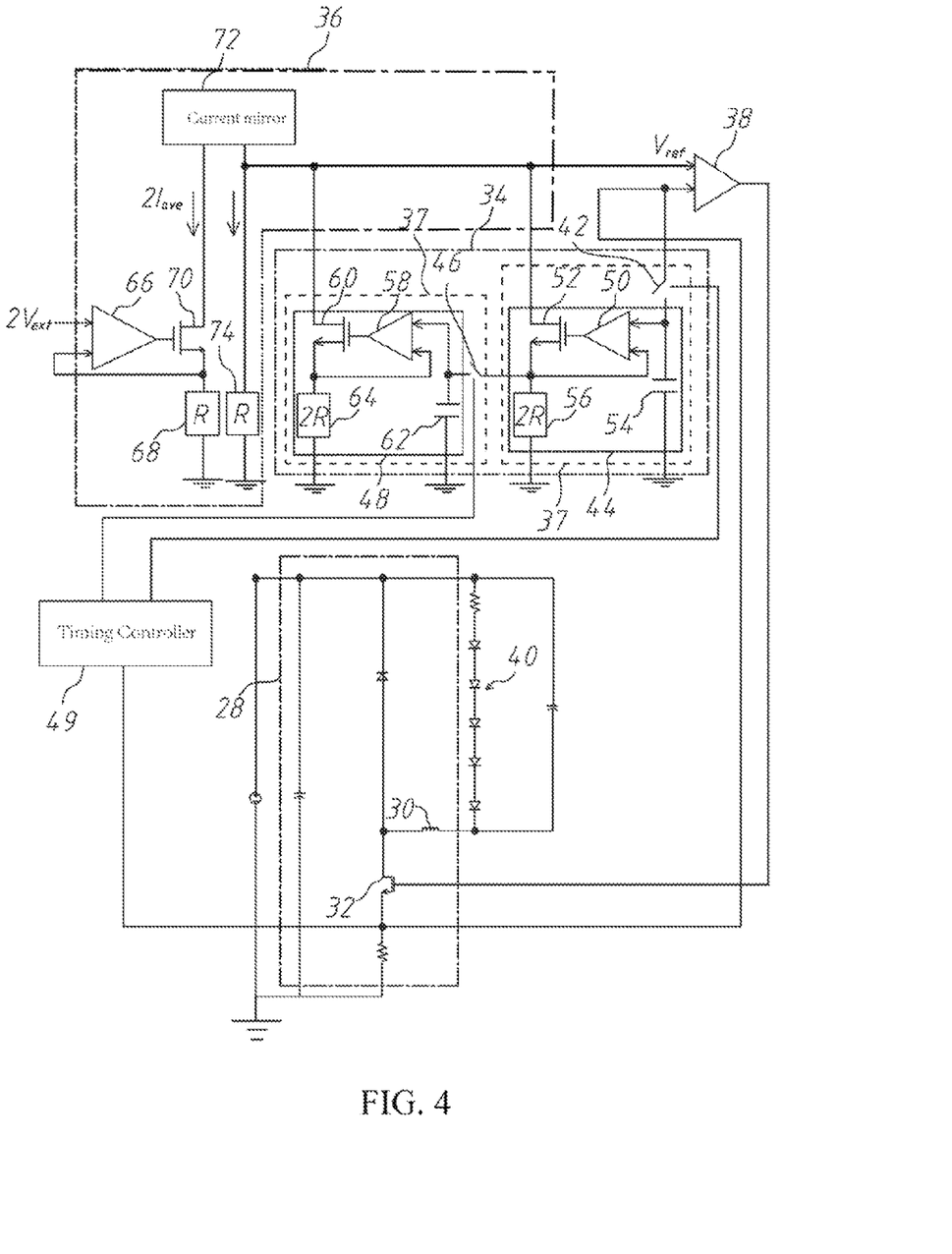
FIG. 4 is a circuit diagram of the control device receiving two inductor valley currents in this invention.

Referring to FIG. 4, the average inductor current mode voltage control device of the present invention includes a DC/DC converter 28, which includes an inductor 30 and a transistor switch 32, a sample-hold inductor valley voltage unit 34 and a reference voltage generation unit 36. The sample-hold inductor valley voltage unit 34 is connected to the inductor 30 through the transistor switch 32 and receives two inductor valley currents of two consecutive cycles and then converts two inductor valley currents into an average inductor valley voltage. The reference voltage generation unit 36 is connected to the sample-hold inductor valley voltage unit 34 and the transistor switch 32 through a comparator 38 and receives from an input port a voltage two times of an external voltage Vext, corresponding to two times of the average inductor current Iave designated for the DC/DC converter operation, and subtract the average inductor valley voltage from two times of the external voltage Vext to produce the reference voltage Vref. The inductor 30, the sample-hold inductor valley voltage unit 34, the reference voltage generation unit 36 and the transistor switch 32 are all connected to the comparator 38 which receives and compares the reference voltage Vref with the inductor sense voltage of the inductor 30, thus the compared result is sent to control the switching of the transistor switch 32, as such the value of the peak inductor current is stabilized at a designated value.

Figure 5:
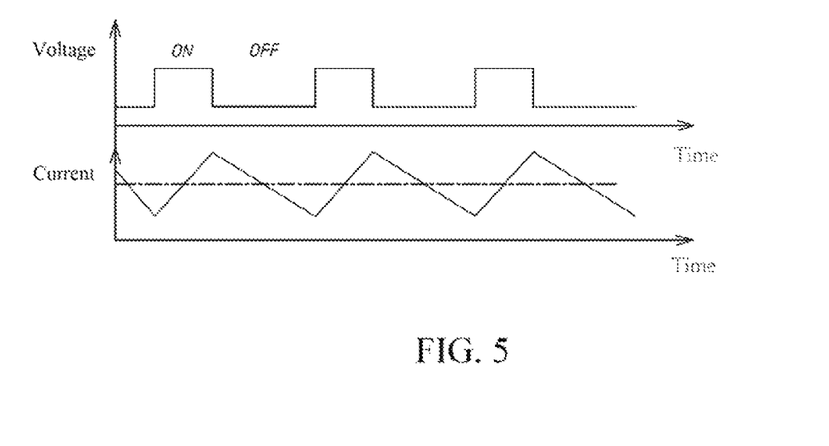
FIG. 5 shows waveform diagrams of the inductor current and inductor voltage of controlling the transistor switch in this invention.
Figure 6:
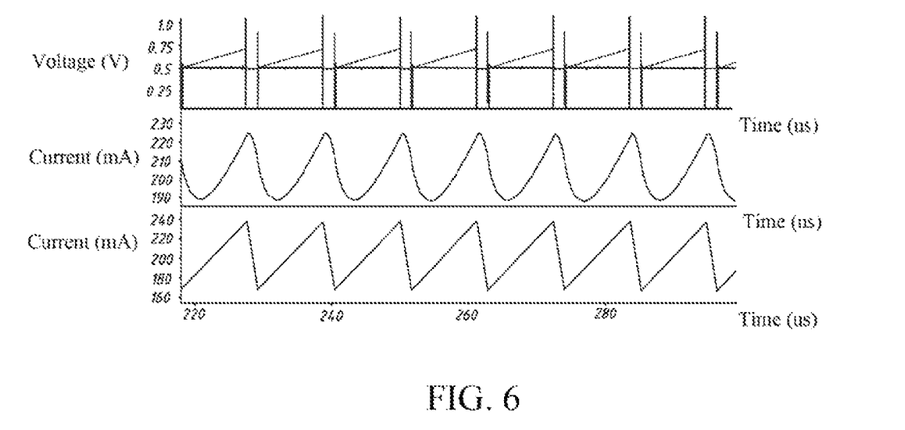
FIG. 6 shows waveform diagrams of source voltage of the transistor switch, current of diode string and inductor current in this invention.

The operation process of the invention is as follows. First, the reference voltage generation unit 36 receives the voltage two times of the external voltage Vext, corresponding to two times of the average inductor current Iave of the inductor 30, and the sample-hold inductor valley voltage unit 34 receives two inductor valley currents of two consecutive cycles and converts the two inductor valley currents into one average inductor valley voltage. Then, the reference voltage generation 36 subtracts the average inductor valley voltage from the two times of external voltage Vext to produce the reference voltage Vref. Finally, the comparator 38 receives and compares the reference voltage Vref with an inductor sense voltage of the inductor 30 and the compared result is sent to control the switching of the transistor switch 32. For example, when the reference voltage and the inductor sense voltage are equal, it means that the compared result is a cut-off signal that turns off the transistor switch (OFF). Conversely, when the reference voltage and the inductance voltage are different, it means that the compared result is an ON-state signal that keeps the transistor on. The current waveform of the control signal for controlling the switching of the transistor switch 32 generated by the comparator 38 is shown in FIG. 5, where the time interval of the voltage at the high level of the control signal is fixed, and the peak inductor current and the inductor valley current are also fixed. In addition, measured waveform is shown in FIG. 6, where the dotted line waveform is the source voltage waveform of the transistor switch 32, under which the current waveform of the LED load diode string 40 and the current waveform of the inductor 30 are provided in sequence, which shows that the peak inductor current and the inductor valley current have been fixed. Therefore, in the present invention, it is not necessary to sense the inductor current at the high voltage terminal (high side), and the effect by the inductor in the DC/DC converter is eliminated. Specific circuits of the sample-hold inductor valley voltage unit 34 and the reference voltage generation unit 36 in FIG. 4 are described as follows.

The two inductor valley currents of two consecutive cycles, for calculating the average inductor valley current as mentioned above, include a first inductor valley current of an immediately previous cycle and a second inductor valley current of current cycle. The first inductor valley current and the second inductor valley currents are converted to one half of a first inductor voltage and one half of a second inductor valley voltage respectively, thus the average inductor valley voltage is the sum of the one half of the first inductor valley voltage and the one half of the second inductor valley voltage. The sample-hold inductor valley voltage unit 34 includes a first and a second sub-sample-hold inductor valley units 37 for receiving and then converting the first inductor valley current and the second inductor valley currents into one half of the first inductor valley voltage and one half of the second inductor valley voltage respectively. The first sub-sample-hold inductor valley voltage unit 37 includes a first sequence switch 42 and a first hold inductor valley voltage unit 44, and the second sub-sample-hold inductor valley voltage unit 37 includes a second sequence switch 46 and a second hold inductor valley voltage unit 48. The first sequence switch 42 is connected to the DC/DC converter 28 for transmitting the first inductor valley current and the second inductor valley current of two consecutive cycles. The first sequence switch 42 is connected to the first hold inductor valley voltage unit 44 that receives the first inductor valley current or the second inductor valley current from the first sequence switch 42 and then converts the first inductor valley current or the second inductor valley current into one half of the first inductor valley voltage or one half of the second inductor valley voltage respectively. The first hold inductor valley voltage unit 44 is connected to the second sequence switch 46 that turns on between the two consecutive cycles when the inductor current gradually decreasing functioning as a transmission path of the one half of the first inductor valley voltage. The second sequence switch 46 is connected to the second hold inductor valley voltage unit 48 that receives the one half of the first inductor valley voltage from the first hold inductor valley voltage unit 44.

The ON states of the first sequence switch 42 and the second sequence switch 46 are controlled by the timing controller 49. The first sequence switch 42, the second sequence switch 46 and the DC/DC converter 28 are connected to the timing controller 49 that turns on the first sequence switch 42 and the second sequence switch 46 between two consecutive cycles when the inductor current gradually decreasing.

The first hold inductor valley voltage unit 44 also includes a first amplifier 50 that is connected to the first sequence switch 42 to receive the first inductor valley current or the second inductor valley current of two consecutive cycles and generate a first conducting signal or a second conducting signal respectively. The first amplifier 50 and the reference voltage generation unit 36 are connected to the first transistor switch 52 that receives the first conducting signal or the second conducting signal generated by the first amplifier 50. Furthermore, the first hold inductor valley voltage unit 44 includes a first capacitor 54 and a first resistor 56. One end of the first capacitor 54 is grounded and the other end of the first capacitor 54 is connected to the first sequence switch 42 and the first amplifier 50. One end of the first resistor 56 is grounded and the other end of the first resistor 56 is connected to the first transistor switch 52 and the first amplifier 50. The first capacitor 54 and the first resistor 56 receive the first inductor valley current or the second inductor valley current through the first sequence switch 42, and then convert the first inductor valley current or the second inductor valley current into a voltage one half of the first inductor valley voltage or one half of the second inductor valley voltage.

The second hold inductor valley voltage unit 48 includes a second amplifier 58 that is connected to the second sequence switch 46 to receive the one half of the first inductor valley voltage and then generates a third conducting signal. The first amplifier 58 and the reference voltage generation unit 36 are connected to a second transistor switch 60 that receives the third conducting signal generated by the second amplifier 58. Furthermore, the second hold inductor valley voltage unit 48 includes a second capacitor 62 and a second resistor 64. One end of the second capacitor 62 is grounded and the other end of the second capacitor 62 is connected to the second sequence switch 46 and the second amplifier 58. One end of the second resistor 64 is grounded and the other end of the second resistor 64 is connected to the second transistor switch 60 and the second amplifier 58. The resistance of the second resistor 64 is the same as that of the first resistor 56. The second capacitor 62 and the second resistor 64 receive the voltage one half of the first inductor valley voltage from the first hold inductor valley voltage unit 44 through the second sequence switch 46.

The reference voltage generation unit 36 includes a third amplifier 66 receiving a voltage two times of the external voltage Vext to produce a fourth conducting signal and a third resistor 68 having a resistance one half of that of the first resistor 56. One end of a third resistor 68 is connected to the third amplifier 66 and the other end of the third resistor 68 is grounded. The third amplifier 66 and the third resistor 68 are connected to a third transistor switch 70 that receives the fourth conducting signal from the third amplifier 66 and generates a current two times of an average inductor current Ivae flowing cross the third transistor switch 70 and the third resistor 68. The third transistor switch 70 is connected to a current mirror 72 that is connected to one end of a fourth resistor 74 with the other end of the fourth resistor 74 being grounded. The resistance of the fourth resistor 74 is the same as that of the third resistor 68. The current mirror 72 copies the current two times of the average inductor current Iave and produces a current two times of the average inductor current Iave through the fourth resistor 74. As such, the voltage two times of the external voltage Vext is subtracted by a sum of the one half of the first and second inductor valley voltages thus generating the new reference voltage Vref.

Figure 7:
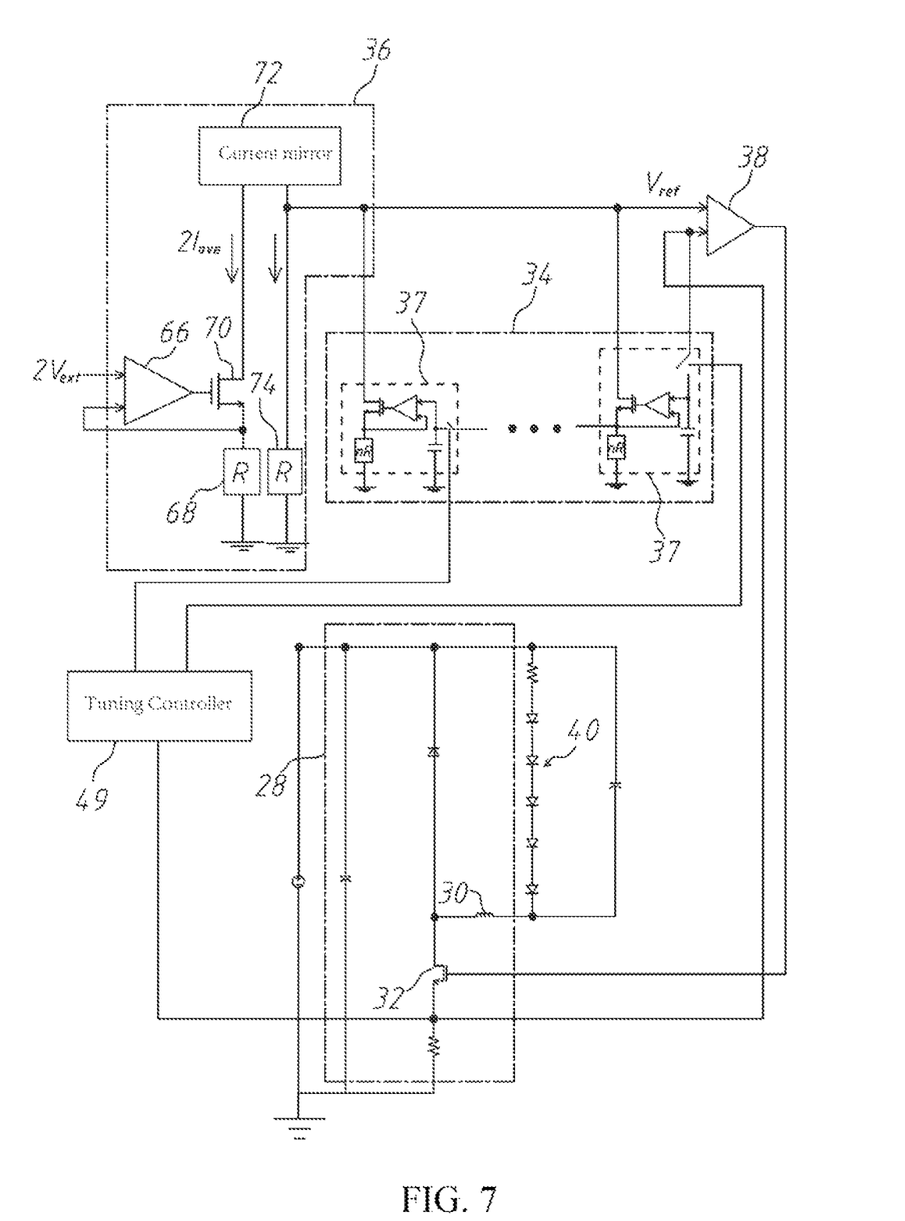
FIG. 7 is a circuit diagram of the control device receiving a plurality of inductor valley currents in this invention.

In the above embodiment, only two inductor valley currents of two consecutive cycles are received to generate the average inductor valley voltage. In an alternative embodiment, as shown in FIG. 7, the sample-hold inductor valley voltage unit 34 includes a plurality of sub-sample-hold inductor valley voltage units 37. Therefore, the sample-hold inductor valley voltage unit 34 receives a plurality of inductor valley currents of a plurality of consecutive cycles, and then converts the plurality of inductor valley currents into the average inductor valley voltage Vave that is the average of the plurality of the inductor valley voltages Vhn, each of which is corresponding to each inductor valley current, as shown in formula (4).

$$Vave = (Vh1 + Vh2 + \ldots + Vhn)/n \qquad (4)$$

The invention provides an average inductor current mode voltage control device and method using the inductor valley currents of two consecutive cycles to fix the inductor peak current, which effectively improves improving the voltage regulation accuracy of the DC/DC converter.

The above-mentioned content is illustrative but not restrictive. It is known to the ordinary technical personnel in this field that, all modifications, changes, or the equivalent within the spirit and scope subject to the following attached claims for this invention are bound to be protected.

The invention claimed is:

1. An average inductor valley current mode voltage control device for a DC/DC converter comprises:
    a sample-hold inductor valley voltage unit connected to the DC/DC converter and receiving at least two inductor valley currents of at least two consecutive cycles produced by an inductor and then converting the at least two inductor valley currents into an average inductor valley voltage; and
    a reference voltage generation unit connected to the sample-hold inductor valley voltage unit and receiving a voltage two times of an external voltage corresponding to two times of an average inductor current produced by the inductor, wherein a reference voltage is generated by subtracting the average inductor valley voltage from the voltage two times of the external voltage for controlling switching of a transistor switch of the DC/DC converter while a peak inductor current is stabilized at a designated value.

2. The average inductor current mode voltage control device of claim 1, wherein the DC/DC converter is a constant off-time DC/DC converter.

3. The average inductor current mode voltage control device of claim 1 further comprising a comparator connected to the sample-hold inductor valley voltage unit, the reference voltage generation unit and the transistor switch of the DC/DC converter, wherein the comparator receives the reference voltage and an inductor voltage produced from the inductor and generates a compared result for switching the transistor switch of the DC/DC converter.

4. The average inductor current mode voltage control device of claim 3, wherein when the reference voltage equals to the inductor voltage, the comparator provides a cut-off signal that turns off the transistor switch of the DC/DC converter.

5. The average inductor current mode voltage control device of claim 3, wherein when the reference voltage is not equal to the inductor voltage, the comparator provides an on-state signal that keeps the transistor switch of the DC/DC converter on.

6. The average inductor current mode voltage control device of claim 1, wherein the two inductor valley currents include a first inductor valley current and a second inductor valley currents of a previous cycle and a current cycle respectively, the average inductor valley voltage is a sum of one half of a first inductor valley voltage and one half of a second inductor valley voltage corresponding to the first inductor valley current and the second inductor valley current respectively; and the sample-hold inductor valley voltage unit comprises a first sequence switch, a first hold inductor valley voltage unit, a second sequence switch and a second hold inductor valley voltage unit, wherein the first sequence switch is connected to the DC/DC converter for transmitting the first inductor valley current and the second inductor valley current of two consecutive cycles; the first hold inductor valley voltage unit is connected to the first sequence switch to receive and then convert the first inductor valley current or the second inductor valley current into one half of the first inductor valley voltage or one half of the second inductor valley voltage respectively; the second sequence switch is connected to the first hold inductor valley voltage unit for transmitting the one half of the first inductor valley voltage when the inductor current is gradually decreased; and the second hold inductor valley voltage unit is connected to the second sequence switch to receive the one half of the first inductor valley voltage.

7. The average inductor current mode voltage control device of claim 6, wherein the first hold inductor valley voltage unit comprises a first amplifier, a first transistor switch, a first capacitor and a first resistor, wherein the first amplifier is connected to the first sequence switch to receive the first inductor valley current or the second inductor valley current and thus output a first conducting signal or a second conducting signal respectively;

the first transistor switch is connected to the first amplifier and the reference voltage generation unit and receives the first conducting signal or the second conducting signal;

one end of the first capacitor is grounded and another end of the first capacitor is connected to the first sequence switch and the first amplifier; and one end of the first resistor is grounded and another end of the first resistor is connected to the first transistor switch and the first amplifier, the first inductor valley current or the second inductor valley current is received by the first capacitor and the first resistor through the first sequence switch and converted into one half of the first inductor valley voltage or one half of the second inductor valley voltage that are outputted through the first transistor switch;

the second hold inductor valley voltage unit comprises a second amplifier, a second transistor switch, a second capacitor and a second resistor, wherein the second amplifier is connected to the second sequence switch to receive one half of the first inductor valley voltage thus output a third conducting signal;

the second transistor switch is connected to the second amplifier and the reference voltage generation unit and receives the third conducting signal;

one end of the second capacitor is grounded and another end of the second capacitor is connected to the second sequence switch and the second amplifier; and one end of the second resistor is grounded and another end of the second resistor is connected to the second transistor switch and the second amplifier, the resistance of the second resistor is the same as that of the first resistor, the one half of the first inductor valley voltage is received by the second capacitor and the second resistor through the second sequence switch and is outputted through the second transistor switch.

8. The average inductor current mode voltage control device of claim 7, wherein the reference voltage generation unit comprises a third amplifier, a third resistor, a third transistor switch, a current mirror and a fourth resistor, wherein the voltage two times of the external voltage is received by the third amplifier to generate a fourth conducting signal;

the resistance of the third resistor is half of that of the first resistor;

one end of the third resistor is grounded and another end of the third resistor is connected to the third amplifier;

the third transistor switch is connected to the third amplifier and the third resistor to receive the fourth conducting signal and to produce a current two times of the average inductor current flowing cross the third transistor switch and the third resistor;

the current mirror is connected to the third transistor switch and to one end of the fourth resistor, the resistance of the fourth resistor is the same as that of the third resistor and another end of the fourth resistor is grounded, the current mirror produces a current two times of the average inductor current passing through the fourth resistor, wherein the reference voltage is generated by subtracting the voltage two times of the external voltage by the sum of the one half of the first inductor valley voltage and the one half of the second inductor valley voltage.

9. The average inductor current mode voltage control device of claim 6 further comprising a timing controller, wherein the timing controller is connected to the first sequence switch and the second sequence switch to temporally turn on the first sequence switch at two consecutive cycles and to temporally turn on the second sequence switch between two consecutive cycles when the inductor current gradually decreasing.

10. The average inductor current mode voltage control device of claim 1, wherein the average inductor valley voltage is an average of a plurality of inductor valley voltages each of which corresponds to an inductor valley current of a plurality of consecutive cycles respectively.

11. An average inductor current mode voltage control method for a DC/DC converter including a transistor switch and an inductor comprising the following steps:

receiving a voltage two times of an external voltage corresponding to a current two times of an average inductor current of the inductor and at least two inductor valley currents of at least two consecutive cycles;

converting the at least two inductor valley currents into an average inductor valley voltage; and subtracting the average inductor valley voltage from the voltage two times of the external voltage to generate a reference voltage for controlling switching of the transistor switch of the DC/DC converter.

12. The average inductor current mode voltage control method of claim 11 further comprising: comparing the reference voltage to an inductor voltage produced by the inductor of the DC/DC converter yielding a compared result used for controlling the switching of the transistor switch of the DC/DC converter , as such a peak inductor current is stabilized at a designated value.

13. The average inductor current mode voltage control method of claim 12, wherein when the reference voltage and the inductor voltage are equal, the compared result is a cut-off signal that turns off the transistor switch.

14. The average inductor current mode voltage control method of claim 12, wherein when the reference voltage and the inductor voltage are not equal, the compared result is an on-state signal that keeps the transistor switch on.

15. The average inductor current mode voltage control method of claim 11, wherein the DC/DC converter is a constant off-time DC/DC converter.

16. The average inductor current mode voltage control method of claim 11, wherein the average inductor valley voltage is an average of a plurality of inductor valley voltages each of which corresponds to an inductor valley current of a plurality of consecutive cycles respectively.

* * * * *